(12) United States Patent
Schwartz

(10) Patent No.: US 10,202,695 B2
(45) Date of Patent: Feb. 12, 2019

(54) PHOTOELECTROLYSIS SYSTEM AND METHOD

(71) Applicant: Palo Alto Research Center Incorporated, Palo Alto, CA (US)

(72) Inventor: David E. Schwartz, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 245 days.

(21) Appl. No.: 14/718,946

(22) Filed: May 21, 2015

(65) Prior Publication Data

US 2016/0340789 A1 Nov. 24, 2016

(51) Int. Cl.
| | |
|---|---|
| *C25B 1/00* | (2006.01) |
| *C25B 1/04* | (2006.01) |
| *C25B 9/06* | (2006.01) |
| *C25B 9/08* | (2006.01) |

(52) U.S. Cl.
CPC ............... *C25B 1/003* (2013.01); *C25B 1/04* (2013.01); *C25B 9/06* (2013.01); *C25B 9/08* (2013.01); *Y02E 60/366* (2013.01); *Y02P 20/134* (2015.11); *Y02P 20/135* (2015.11)

(58) Field of Classification Search
CPC .. C25B 1/003; C25B 9/08; C25B 1/04; C25B 9/06; Y02P 20/135; Y02P 20/134; Y02E 60/366
USPC ........................................................ 205/340
See application file for complete search history.

(56) References Cited

U.S. PATENT DOCUMENTS

| | | | |
|---|---|---|---|
| 4,011,149 A | 3/1977 | Nozik | |
| 4,172,925 A | 10/1979 | Chen et al. | |
| 5,066,378 A * | 11/1991 | Meneghini | ............... C25B 9/08 204/237 |
| 7,750,234 B2 | 7/2010 | Deng et al. | |
| 7,892,407 B2 | 2/2011 | Gibson et al. | |
| 8,313,634 B2 * | 11/2012 | Bocarsly | ................. C25B 1/003 205/440 |
| 2004/0112739 A1 * | 6/2004 | Kim | ......................... C25B 9/06 204/237 |
| 2005/0000792 A1 * | 1/2005 | Yamada | ................. B01J 19/127 204/157.15 |

(Continued)

OTHER PUBLICATIONS

Chen et al., "Modeling the Performance of an Integrated Photoelectrolysis System with 10x Solar Concentrators", Journal of the Electrochemical Society, Vo. 161 (10), 2014, pp. F1101-F1110.

(Continued)

*Primary Examiner* — Nicholas A Smith
*Assistant Examiner* — Colleen M Raphael
(74) *Attorney, Agent, or Firm* — Hollingsworth Davis, LLC

(57) ABSTRACT

A photoelectrolysis system includes at least one photoelectrochemical (PEC) cell having at least one photoanode and at least one photocathode. A light concentrator provides concentrated light to PEC cell. The PEC cell electrolyzes the electrolyte into $H_2$ and $O_2$ in response to excitons generated by the concentrated light on the PEC cell. An electrolyte flow apparatus moves the electrolyte over surfaces of one or both of the photoanode and the photocathode at a flow rate that is based on one or more characteristics of the photoelectrolysis.

25 Claims, 9 Drawing Sheets

(56) References Cited

U.S. PATENT DOCUMENTS

| | | | | |
|---|---|---|---|---|
| 2005/0178427 A1* | 8/2005 | Kelly | .................. | C25B 1/04 205/923 |
| 2007/0221496 A1* | 9/2007 | Bohnke | .................. | C25B 9/08 204/242 |
| 2007/0246370 A1* | 10/2007 | Dimroth | .................. | C25B 1/04 205/628 |
| 2008/0299697 A1* | 12/2008 | Guerra | .................. | C25B 1/003 438/57 |
| 2010/0116752 A1* | 5/2010 | Wiemers | .................. | B01D 61/022 204/252 |
| 2010/0133111 A1* | 6/2010 | Nocera | .................. | C25B 1/003 204/292 |
| 2011/0226632 A1* | 9/2011 | Cole | .................. | C25B 3/04 205/446 |
| 2012/0024702 A1* | 2/2012 | Heldal | .................. | F04B 19/006 204/456 |
| 2012/0216854 A1* | 8/2012 | Chidsey | .................. | C25B 1/003 136/248 |
| 2013/0277209 A1* | 10/2013 | Sato | .................. | C25B 1/003 204/252 |
| 2014/0021034 A1* | 1/2014 | Lewis | .................. | C25B 1/003 204/157.15 |
| 2015/0053568 A1* | 2/2015 | Chueh | .................. | C25B 1/003 205/340 |
| 2016/0201197 A1* | 7/2016 | Monzyk | .................. | C25B 3/04 427/380 |
| 2016/0281247 A1* | 9/2016 | Friedman | .................. | C25B 9/08 |

OTHER PUBLICATIONS

Wang et al., "Solar Fuel Production for a Sustainable Energy Future: Highlights of a Symposium on Renewable Fuels from Sunlight and Electricity", The Electromechanical Society Interface, Summer 2013, pp. 69-71.

* cited by examiner

US 10,202,695 B2

PHOTOELECTROLYSIS SYSTEM AND METHOD

TECHNICAL FIELD

This disclosure generally involves a photoelectrolysis system as well as devices and methods related to the photoelectrolysis system.

BACKGROUND

Photoelectrolysis of aqueous electrolytes by radiation to produce hydrogen and oxygen involves a process whereby light absorbed in one or both electrodes of an electrochemical cell generates electron-hole pairs (excitons). The excitons are separated and injected into the electrolyte at the photocathode and photoanode, respectively, to produce reduction and oxidation reactions. Photoelectrolysis can be used as a way to convert solar energy into chemical energy and as a way to store the energy for later use.

SUMMARY

Some embodiments involve a photoelectrolysis system that includes at least one photoelectrochemical (PEC) cell comprising a photoanode and a photocathode. An optical concentrator is configured to provide concentrated light to the PEC cell. The concentrated light generates excitons in the PEC cell which electrolyzes an electrolyte into $H_2$ and $O_2$ in response to the excitons. An electrolyte flow apparatus moves the electrolyte over surfaces of one or both the photoanode and the photocathode at a flow rate based on one or more characteristics of the photoelectrolysis.

Some embodiments are directed to a photoelectrolysis method. Light is concentrated onto a photoelectrochemical (PEC) cell, causing excitons to be generated in the PEC cell. The excitons cause electrolysis of electrolyte into hydrogen and oxygen at a surface of one or both of the photoanode and photocathode of the PEC cell The electrolyte is caused to flow over the surfaces of one or both of the photoanode and the photocathode at a flow rate that is a function one or more characteristics of the photoelectrolysis.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
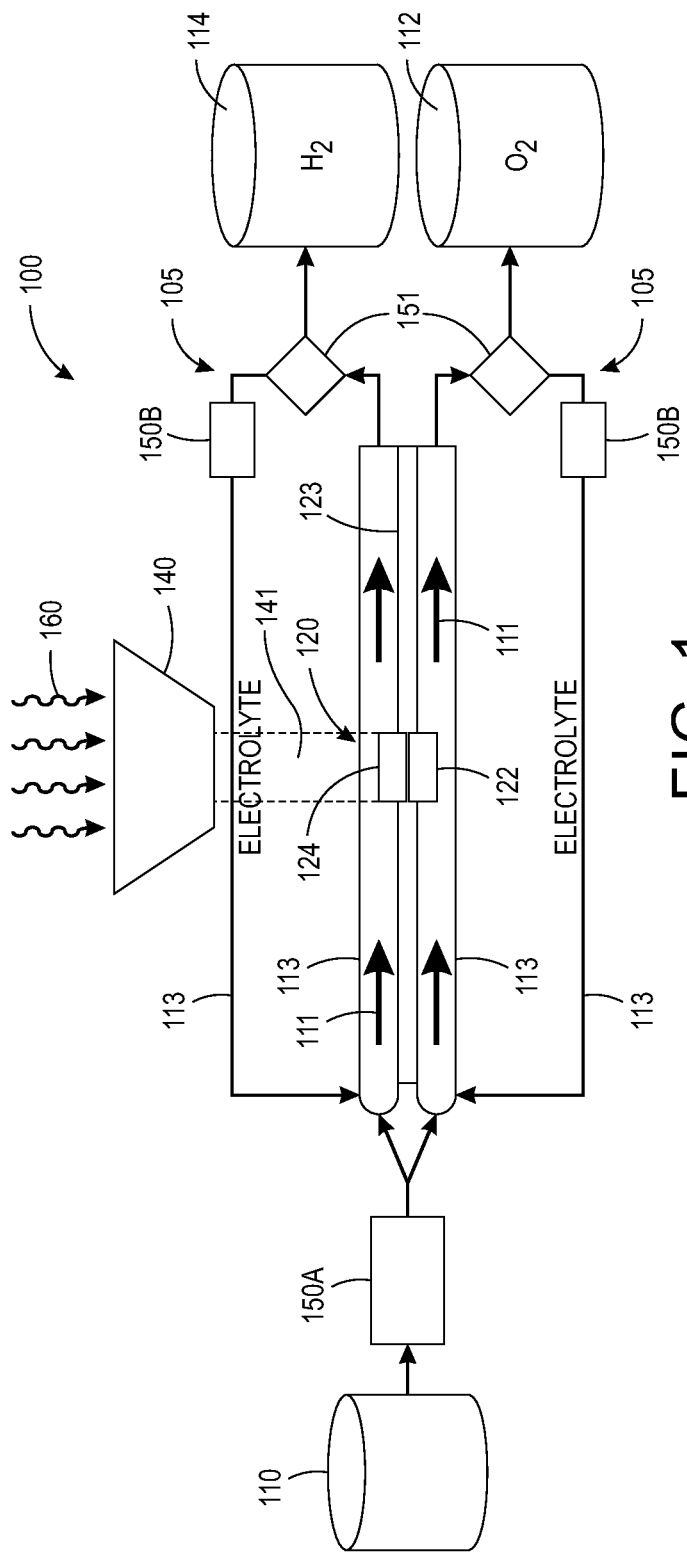
FIG. 1 is a block diagram illustrating a photoelectrolysis system in accordance with one or more embodiments of the present disclosure.

Embodiments described herein are directed to photoelectrolysis systems and methods. A photoelectrolysis system includes a photoelectrochemical (PEC) cell that splits an electrolyte, such as an aqueous electrolyte, under radiation, e.g., solar radiation, into constituent components of the electrolyte. In some embodiments, the PEC cell, like a photovoltaic cell, includes a material that is capable of absorbing photons and converting the photons to excitons (electrons and holes). Oxidation and reduction reactions occur at the photoanode and photocathode electrodes of the PEC cell that split electrolyte molecules into constituent components. In embodiments where the electrolyte is water-based the photoelectrolysis process splits the water into oxygen molecules and hydrogen ions. Examples discussed herein involve photoelectrolysis of water into constituent components hydrogen and oxygen. In some embodiments the electrolyte may be acidic or highly acidic, for example, with a pH less than about 3. In other embodiments, the electrolyte may be basic or highly basic, for example, with a pH greater than about 13.

A number of materials can be used as photoanodes or photocathodes in PEC cells, including WO3, Fe2O3, TiO3, and CdS, NzS, GaAs, GaN, GaInP2. In some cases, stacks of PEC cells in series are used having the same material and/or different materials. For example, multiple III-V semiconductors can be used in combination, such as $GaInP_2$/GaAs. These cells can achieve solar-to hydrogen efficiencies of greater than 10%. In some cases, the photoelectrolysis system may include multiple PEC cells that may be physically adjacent to each other and/or may operate in series and/or in parallel. In some embodiments, PEC cells of a multi-PEC cell system may share concentrator optics and/or may share an electrolyte flow mechanism. In some embodiments, PEC cells of a multi-PEC cell system may have separate optics and/or a separate electrolyte flow mechanism. According to some embodiments, the PEC cell is a semiconductor device, or can be any other type of device capable of converting photons into excitons. The photoanode and photocathode of the PEC cell may include dopants, coatings or surface treatments, for example, to protect and/or prevent degradation of the photoanode and/or photocathode, and/or to modify the Fermi level of the PEC cell. The photocathode and/or photoanode may also include catalysts, e.g., a catalyst layer disposed on the surface, to enhance reaction kinetics and/or reduce overpotentials.

One challenge with photoelectrolysis is to reduce cost per kilogram of hydrogen produced. One means of reducing cost is by increasing throughput, for example by using optical concentrators having a relatively high optical concentration power, e.g., 50×-1000×, and/or solar tracking. However, increasing the areal density of hydrogen generation in this way leads to an increase in gas bubbles that collect at the electrode surfaces as the photoelectrolysis proceeds. Gas bubbles that persist at the electrode surface can impede access of the electrode to the electrolyte and slow the photoelectrolysis process. Furthermore gas bubbles in the optical path, e.g., the space between the lens and the PEC cell, between the concentrator and the cell scatter incoming light. According to various embodiments described herein, gas bubbles that collect at the surface of the electrodes and in the optical path can be reduced by flowing the electrolyte past one or both electrode surfaces of a PEC cell at a flow rate that is a function one or more characteristics of the photoelectrolysis system or photoelectrolysis process. Flowing electrolyte has the additional benefit of actively cooling the cell, which can increase its conversion efficiency. It also can improve current density uniformity, reducing hot spots, decreasing resistive loss, and increasing catalytic effectiveness.

FIG. 1 illustrates photoelectrolysis systems 100 capable of decreasing bubbles that collect at an electrode surface of a PEC cell. The system 100 in FIG. 1 comprises a PEC cell 120 that includes a photoanode 122 and a photocathode 124. The system 100 includes an electrolyte (for example aqueous $H_2SO_4$) 110, that flows through channels 113 and is brought in contact or in close proximity with both the photoanode 122 and the photocathode 124 of the PEC cell 120. Arrows 111 indicate a flow path of the electrolyte, although other flow paths could alternatively be used. The electrolyte 110 provides ionic conductivity between the photoanode 122 and the photocathode 124. In response to optical radiation 160, electron-hole pairs form in the photoelectrochemical cell 120. The holes react with electrolyte⁻ at the surface of the photoanode 122 to produce oxygen gas which is collected in space 112. The electrons react with $H^+$ ions at the surface of the photocathode 124 to produce hydrogen gas which is collected in space 114. It will be appreciated that although the photocathode is shown as being on the side of the PEC cell that receives the optical radiation 160 in this example, the reverse is also possible, wherein the photoanode is disposed on the side of the PEC cell that receives the optical radiation.

The photoelectrolysis system 100 includes a gas removal unit 151. The gas removal unit 151 can provide a volume and pressure of the electrolyte that are high enough so that the gases remain dissolved in the electrolyte. In some embodiments, the gas removal unit is configured to depressurize the electrolyte to some extent so as to evolve the gas and to subsequently repressurize the electrolyte and the gas. The choice of pressure and/or the flow rate of the electrolyte may be chosen to reduce, e.g., minimize, the work required to remove the gas. According to some configurations, the gas removal unit 151 may also serve as a circulating pump, e.g., in addition to or in place of circulating pumps 150b.

In some embodiments the photoelectrolysis system includes an optional gas purifier unit after the separator. For example, one type of suitable purifier comprises a drier to remove excess water.

In the illustrated embodiment, the electrolyte 110 on the photoanode 122 side of the PEC cell 120 is separated from the electrolyte 110 on the photocathode 124 side of the PEC cell 120 by a membrane 123. Membrane 123 reduces mixing of $H_2$ and $O_2$ gases generated by the photoelectrolysis process while allowing ion transport between the photoanode and photocathode sides of the PEC. In some embodiments, an external bias between the photoanode and the photocathode may be used. One possible membrane material is NAFION, a proton conductor. In alternative embodiments, a porous separator is used in place of a membrane.

The system 100 consumes electrolyte and produces $H_2$ and $O_2$, so to replace these components, new electrolyte must be added to the system. FIG. 1 shows a scheme in which the electrolyte is flowed past the photoanode and photocathode in a recirculating loop and electrolyte is added to the flow channels 113, e.g., at a mass flow rate equivalent to the gas production mass flow rate.

In some configurations, as discussed in more detail below, either the photoanode or photocathode may not be directly in contact with the electrolyte, but may be electrically connected to the electrolyte via a conductive (e.g., metal or transparent conductive oxide) coating or wire. The photocathode and/or photoanode may also include catalysts to enhance reaction kinetics and/or to reduce overpotentials. Suitable catalysts include pure or alloyed platinum, iridium, nickel, molybdenum, cobalt, or many other materials. The catalysts may be attached to the surface of one or both electrodes as nanoparticles, microparticles, grids, coatings, or by other means. In addition, the electrodes 122, 124 may be coated or treated to increase their lifetimes in some embodiments.

At least a portion of the flow channel 113 walls may be optically transparent to the incident light 160. An optical concentrator 140 focuses light 160 onto the PEC cell 120 through the transparent wall and through the electrolyte 110 in flow channel the 113 in the optical path 141. The concentrator 140 may be or comprise one or more of a lens system, a mirror system, and/or any other structure that provides optical concentration. The concentrator power may be greater than about 10×, greater than about 50×, or greater than about 75×. For example, in some cases, the concentrator 140 has a concentrator power of greater than about 100×. In some cases, the concentrator power is between about 50× and about 500×.

The concentrator 140 may have one or more coatings, for example, optical filters, allowing only certain wavelengths of light to pass through to the PEC cell 120. Optical filters can reduce the amount of light outside the conversion spectrum of the PEC cell, which would otherwise generate heat.

During photoelectrolysis, gas bubbles, such as hydrogen and/or oxygen bubbles, form and may remain on the surface of the electrodes during the photoelectrolysis process. Gas bubbles that remain on the electrodes 122, 124 impede access of the electrolyte 110 to the surfaces of the electrodes 122, 124 which are the sites where the oxidation and reduction reactions of the photoelectrolysis occur. Bubbles that persist at the surface of the electrodes 122, 124 reduce the efficiency of the photoelectrolysis process. Moreover, gas bubbles may form in the optical path 141 between the concentrator 140 and the PEC cell 120. These bubbles can scatter incoming light, reducing the amount of light that reaches the PEC cell 120, thereby reducing efficacy.

The photoelectrolysis system 100 includes electrolyte flow apparatus 105 comprising one or more pumps 150a, 150b and flow channels 113 that operate to cause the electrolyte 110 to flow into and through the flow channels 113 and over the surfaces of one or both of the photoanode 122 and the photocathode 124. In the illustrated embodiment, pump 150a pumps electrolyte from a source to the flow channels 113 and pump(s) 150b move the electrolyte 110 through the flow channels 113 and across the surfaces. In various embodiments, the electrolyte flow apparatus 105 is configured to move the electrolyte over the surfaces of one or both electrodes 122, 124 at a rate that provides laminar flow of the electrolyte. The flow rate is selected to reduce bubble collection at surfaces of the electrodes 122, 124 and/or in the optical path 141 and/or to reduce the concentration of gas at the electrode surfaces and/or in the optical path 141. For example, in some embodiments, the flow rate may be selected to reduce the gas concentration to be less than a target concentration, e.g., 0.02 moles per liter or less. The target concentration may be determined based on the speed of the photoelectrolysis process which can be determined by the estimated or measured rate of gas production.

A photoelectrolysis system as disclosed herein provides an average concentration of bubbles that is reduced at the electrode surfaces and/or in the optical path when compared to a photoelectrolysis system that does not provide a mechanism for flowing the electrolyte. For example, the flow rate may be selected to reduce the average concentration of the (gas) bubbles in these regions by more than about 50%, or more than about 70%, or more than about 90% when compared to a system without an electrolyte flow apparatus.

In some implementations, preventing bubbles from collecting at the electrode surface may be expressed in terms of a surface area of one or both electrodes that is substantially bubble-free. For example, in some implementations, the flow rate may be selected to substantially prevent or reduce bubble collection over more than about 30% or more than about 50%, or more than about 70%, or more than about 90% of the surface area of one or both of the electrodes.

If bubbles have already collected at the surface of one or both of the electrodes, the flow rate may be selected to remove bubbles over more than 50% or more than 70%, or more than 90% of the surface area of one of both of the electrode surfaces. According to various implementations, the flow rate of the electrolyte can be selected to provide accessibility of the electrolyte to a predetermined electrode surface area, e.g., a majority (greater than 50%), a substantial majority (more than 70%), or substantially all (greater than 95%) of the surface area of the electrode surfaces to the electrolyte.

According to various implementations, the electrolyte and/or the gases emitted by the PEC cell 120 may be pressurized. In some embodiments, there may be a separate pressurizing pump that pressurizes the electrolyte as it comes into the system 100 that is separate from the supply pump 150a and/or the circulating pump 150b. Pressurizing the electrolyte 110 can increase the solubility of the oxygen and hydrogen gases into the electrolyte 110 which in turn may reduce the flow rate needed to prevent collection of gas bubbles and/or to remove gas bubbles from the surface of the electrodes 122, 124. Thus, pressurizing the electrolyte 110 may be useful in allowing the circulating pump 150b to operate at a lower power. The pressurizing pump may be configured to pressurize the electrolyte 110 to at least 30 atm or at least 100 atm or at least 700 atm, for example. Hydrogen pressurized at up to 700 atm or higher is a desirable product of the system, for example for use as a fuel source on vehicles.

In some embodiments, the electricity to operate the pumps 150a,b and/or other system components may be obtained from a photovoltaic array that converts sunlight into electricity. The photovoltaic array may be arranged on the tracking system of the photoelectrochemical device (described in more detail below) and/or may be arranged so that concentrated or unconcentrated light falls on the photovoltaic array.

Heat is generated during the photoelectrochemical conversion process due to cell and system inefficiencies. Excessive heat at the PEC cell 120 may reduce performance and/or damage the PEC cell 120 and/or other components of the system 100. In addition to preventing or reducing gas bubbles on the electrode surface and/or in optical path, flowing the electrolyte 110 past the PEC cell 120 may also operate to remove heat from the PEC cell 120. The circulating pump 150b may be configured to flow the electrolyte 110 at a flow rate that maintains a temperature of the PEC cell 120 in a specified temperature, e.g., within a temperature range that provides specified (e.g., optimal) operation of the PEC cell such as about 290 K to about 350 K. In some cases, the pump 150b is configured to move the electrolyte at a flow rate capable of removing heat at a rate of 1 to 50 W/cm$^2$.

According to various implementations, the pump 150b causes the electrolyte 110a to flow past the PEC cell 120 at a rate that is based on one or more characteristics of the photoelectrolysis system or photoelectrolysis process such as the concentrator power, gas production rate, system pressure, electrolyte pressure, gas concentration, e.g., at the electrode surface and/or optical path, electrode surface area covered by bubbles, concentration of bubbles in a volume of the electrolyte, electrolyte pressure, heat generated by the PEC cell, light intensity, and and/or heat generation rate of the photoelectrochemical process. According to some implementations, one or more of these characteristics may be estimated based on system specifications. Alternatively or additionally, one or more of these characteristics may be directly or indirectly measured using one or more sensors. In some implementations, the flow rate of the electrolyte can be adaptively changed based on the system or process characteristics.

Figure 2:
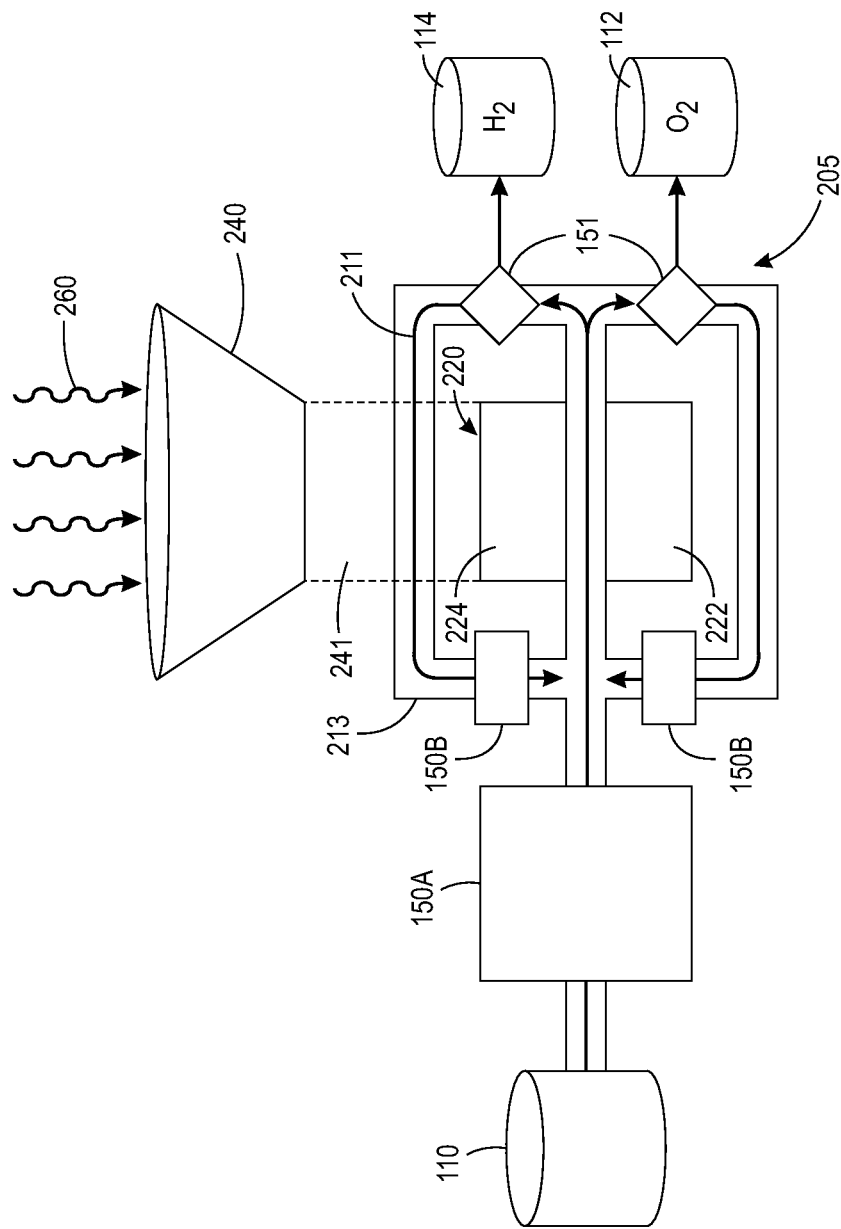
FIG. 2 is a block diagram of a photoelectrolysis system wherein the electrolyte flows between the photoanode and photocathode in accordance with one or more embodiments of the present disclosure.

FIG. 2 illustrates a photoelectrolysis system 200 in accordance with various embodiments described herein. The system in FIG. 2 includes a PEC cell 220 including a photoanode 222 and a photocathode 224 where the photoelectrochemical process occurs. The electrolyte 210 is caused to flow between and over the surfaces of the photoanode 222 and the photocathode 224 by an electrolyte flow apparatus comprising pumps 150a,b and flow channels 213. Arrow 211 indicates the flow path of the recirculating electrolyte flow. In this embodiment, the electrolyte 110 flows between the photoanode 222 and the photocathode 224.

A concentrator 240 focuses light 260 onto the photocathode 224 of the PEC cell 220. Note that in alternate embodiments, a concentrator may focus light onto the photoanode 222. Gas bubbles form at the interface between the electrolyte and the photoanode 222 and/or at the interface between the electrolyte and the photocathode 224. Bubbles may be present in the optical path 241 between the concentrator 240 and the PEC cell 220.

The system 200 includes an electrolyte flow apparatus 205 including one or more pumps 150a,b that operate to supply and recirculate and flow the electrolyte 210 such that the electrolyte 210 is moving and in contact or close proximity with surfaces of both the photoanode 222 and the photocathode 224. As previously discussed, the flow rate of the electrolyte 210 is based on one or more characteristics of the photoelectrolysis system and/or photoelectrolysis process. For example, the flow rate of the electrolyte 210 may be selected to prevent or reduce bubble collection at the electrode surface, to remove bubbles that have already collected there, to reduce the concentration of bubbles or gas in the electrolyte in the region 241 between the concentrator 240 and the PEC cell 220 and/or to remove thermal energy from the PEC cell 220.

Figure 3A:
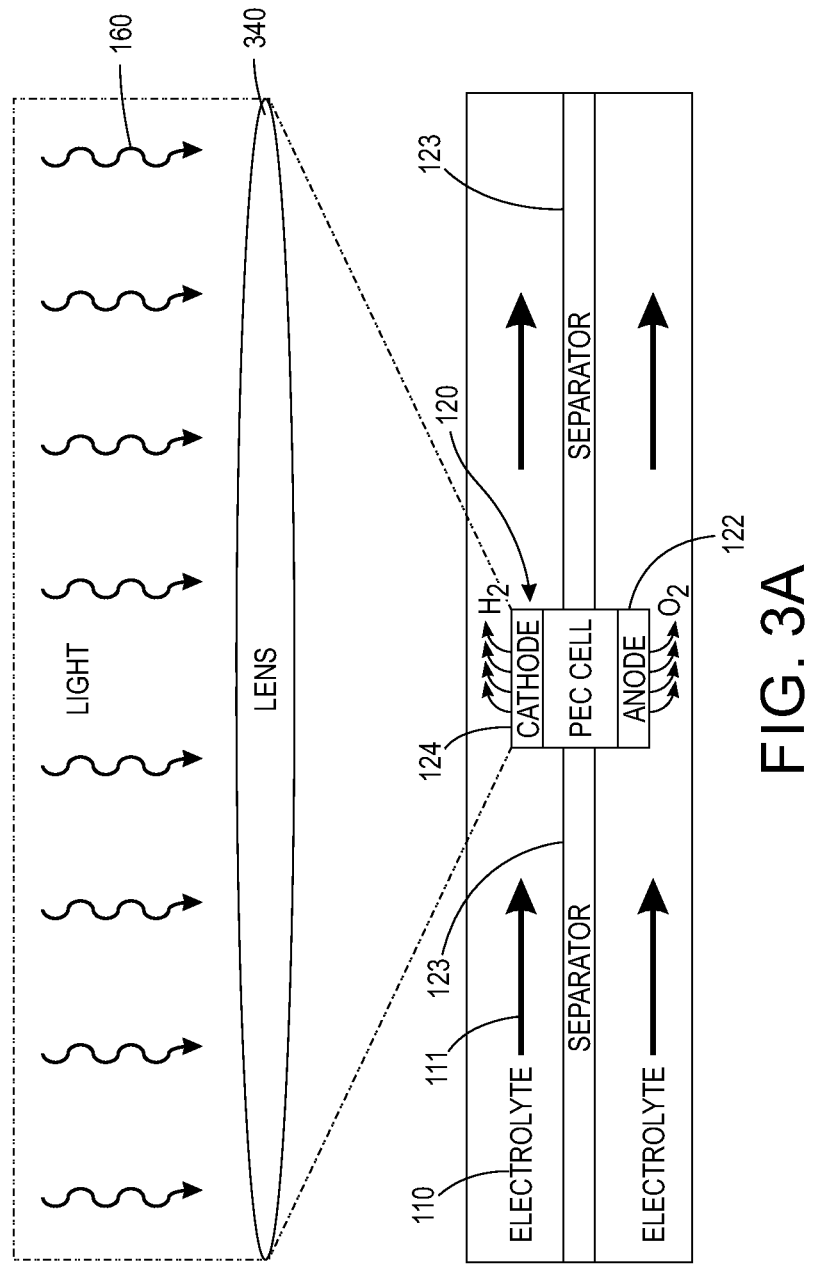
FIG. 3A is a depiction of the photoelectrochemical (PEC) cell and concentrator of FIG. 1 in more detail.
Figure 3B:
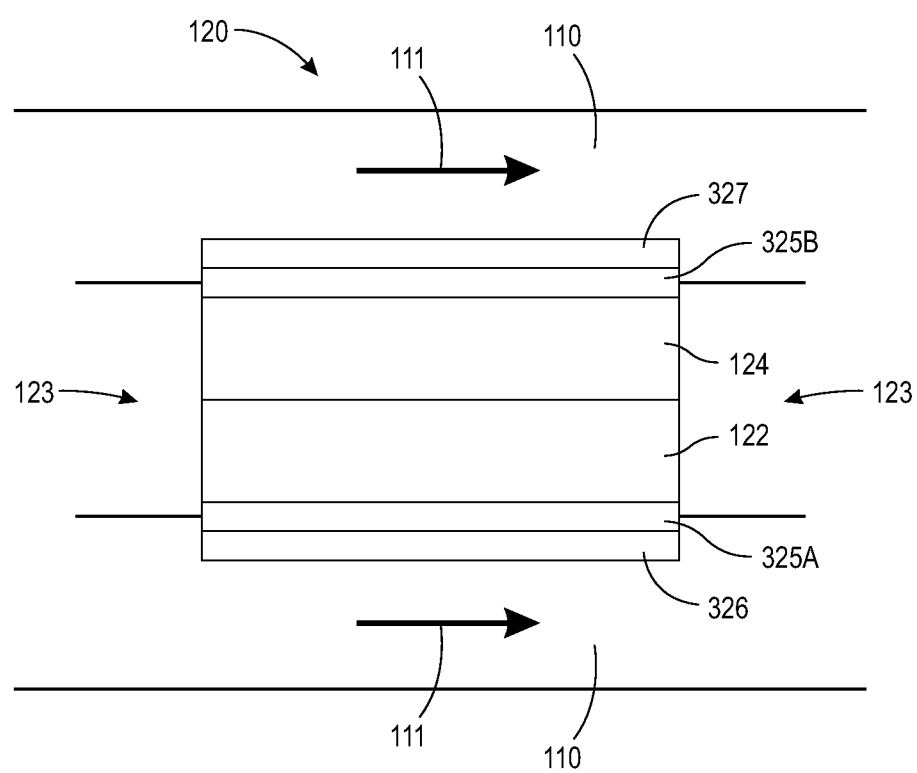
FIG. 3B shows the PEC cell of FIG. 3A in more detail including various optional features in accordance with one or more embodiments.

FIGS. 3A and 3B show additional details of the PEC cell 120 and concentrator 140 of the system 100. In various embodiments, the concentrator 140 may be or comprise a transmitting or a reflecting concentrator. The concentrator may comprise a two dimensional or three dimensional Fresnel lens, a compound parabolic concentrator, and/or dielectric totally internally reflecting concentrator, for example. FIG. 3A illustrates the use of a compound parabolic concentrator 340.

As illustrated in FIG. 3B, one or more layers may be disposed on the photoanode 122 and/or photocathode 124. For example, in some embodiments, layers 325a,b comprise protective layers. In some embodiments, one or both layers 325a,b are transparent conductive oxide layers that serve to aid in uniformity of current distribution and/or to reduce ohmic losses. Layers 226, 327 may be catalyst layers e.g., oxygen evolution catalyst and/or hydrogen evolution catalyst, that enhance proton production and proton consumption, respectively.

In some embodiments, the photoelectrolysis system includes a gas removal unit (not shown in FIG. 3A or 3B). The gas removal system allows for a volume and pressure of the electrolyte that are high enough so that the gases remain dissolved in the electrolyte. In some embodiments, the gas removal unit is configured to depressurize the electrolyte to some extent so as to evolve the gas and to subsequently repressurize the electrolyte and the gas. The choice of pressure and/or the flow rate of the electrolyte may be chosen to reduce, e.g., minimize, the work required to remove the gas. In some embodiments the photoelectrolysis system includes an optional gas purifier unit after the separator. For example, one type of suitable purifier comprises a drier to remove excess water.

The photoelectrolysis systems 100 and 200 shown in FIGS. 1-3 illustrate to possible configurations of the PEC cell and concentrator. It will be appreciated that the system may include many PEC cells and concentrators such as those illustrated herein connected in parallel and/or in series. In some cases, the connected PEC cells may share a common electrolyte flow apparatus and/or may be mounted together on a common tracking platform.

Figure 4:
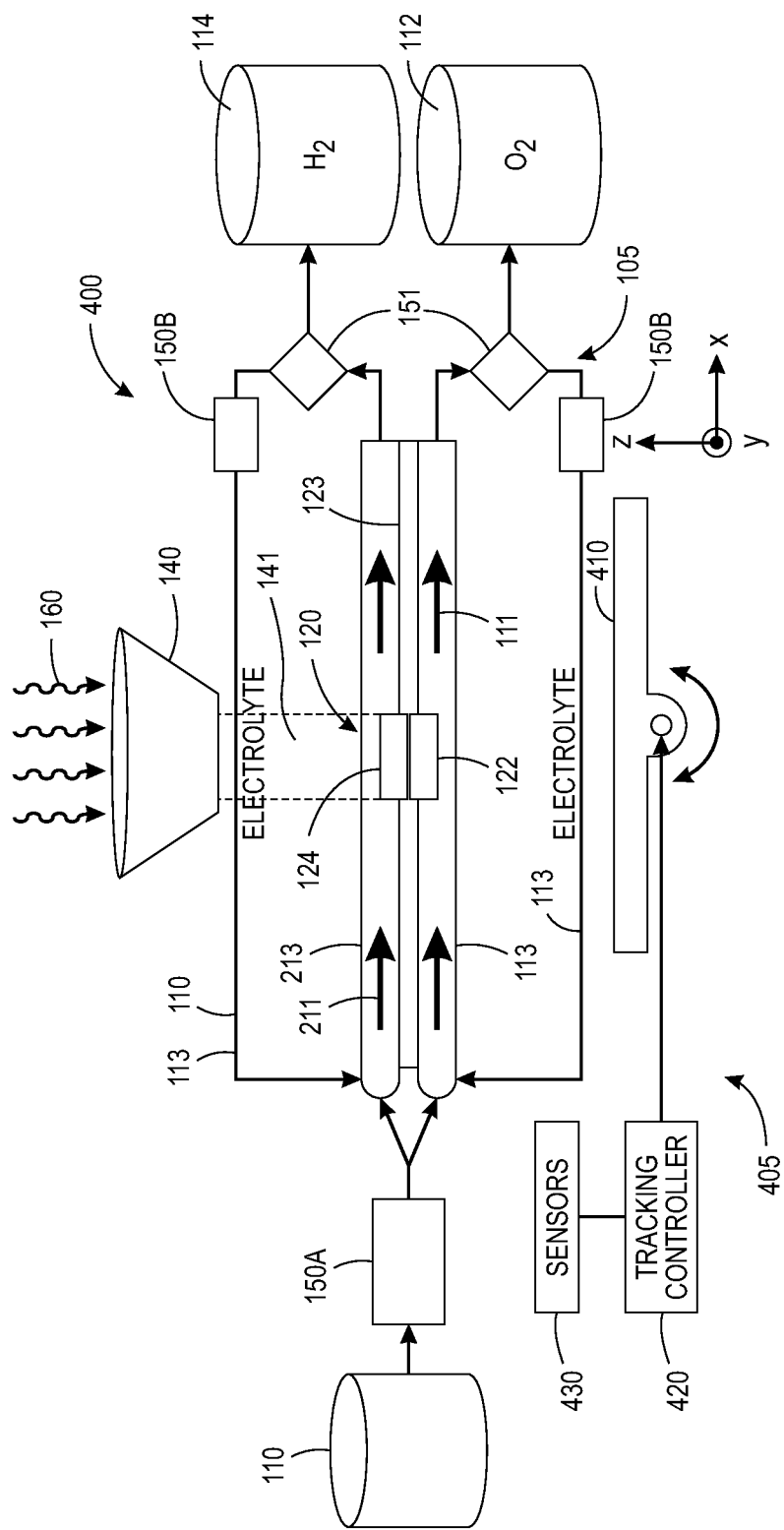
FIG. 4 is a diagram illustrating a photoelectrolysis system that includes a tracking apparatus.

FIG. 4 illustrates a photoelectrolysis system 400 that is similar in some respects to the photoelectrolysis system depicted in FIG. 1. System 400 includes a tracking mount 410 upon which the PEC cell 120, electrolyte flow apparatus 105, and/or optical concentrator 140 are mounted. The tracking mount 410 is a component of a tracking system 405 which may also include additional components. In some embodiments, the tracking system 305 includes a tracking controller 420 that generates an electrical signal to control the rotational position of the tracking mount 410. The tracking controller 420 may be configured to automatically rotate the tracking mount 410 in one or two dimensions (around x and y axes as shown in FIG. 4) to track the sun's movement For example, the tracking controller 420 may control the rotation of the tracking mount 410 based on a time of day and/or time of year such that the tracking mount 410 moves the PEC cell 120, concentrator 140, and/or electrolyte flow system 105 based solely or partly on a location that the sun is expected to be at the particular time of day and/or time of year. According to some embodiments, the tracking system 405 is configured to change the rotational position of the tracking mount 410 based solely or partly on optical intensity measured using one or more optical sensors 430. The tracking system 405 may rotate the tracking mount 410 in one or two dimensions so the concentrator 140 and/or the PEC cell 120 are exposed to a specified, e.g., optimum, estimated or measured optical intensity.

Figure 5A:
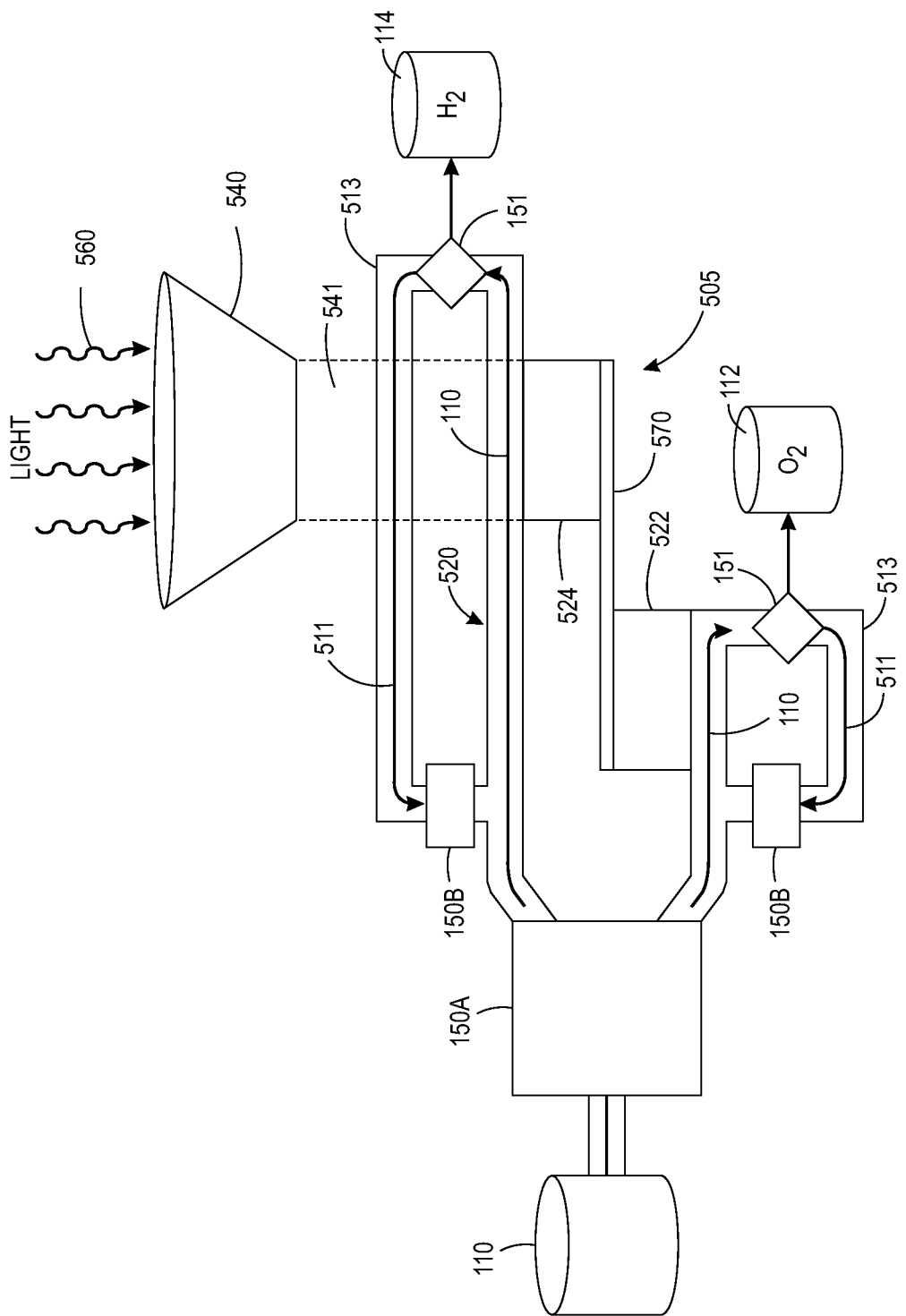
FIGS. 5A and 5B show photoelectrolysis systems having a PEC cell that is separated from a counter electrode of a PEC cell by a conductor in accordance with embodiments of the present disclosure.

FIG. 5A shows a photoelectrolysis system 500 that includes a PEC cell 520 having a first electrode 524, which may be either the photoanode or photocathode, and a second electrode 522. The second photoelectrode 522 is connected to the first photoelectrode 524 by conductor 570, e.g., a metal. The photoelectrolysis system 500 includes an electrolyte flow apparatus 505 that includes at least a pump 550 and flow channels 513. The pump 550 pumps the electrolyte 110 through the flow channels 513 as indicated by arrows 511, carrying the electrolyte 110 over surfaces of the first and second electrodes 522, 524. A concentrator 540 focuses light 560 through the electrolyte 110 onto the surface of the photoelectrode 524.

Figure 5B:
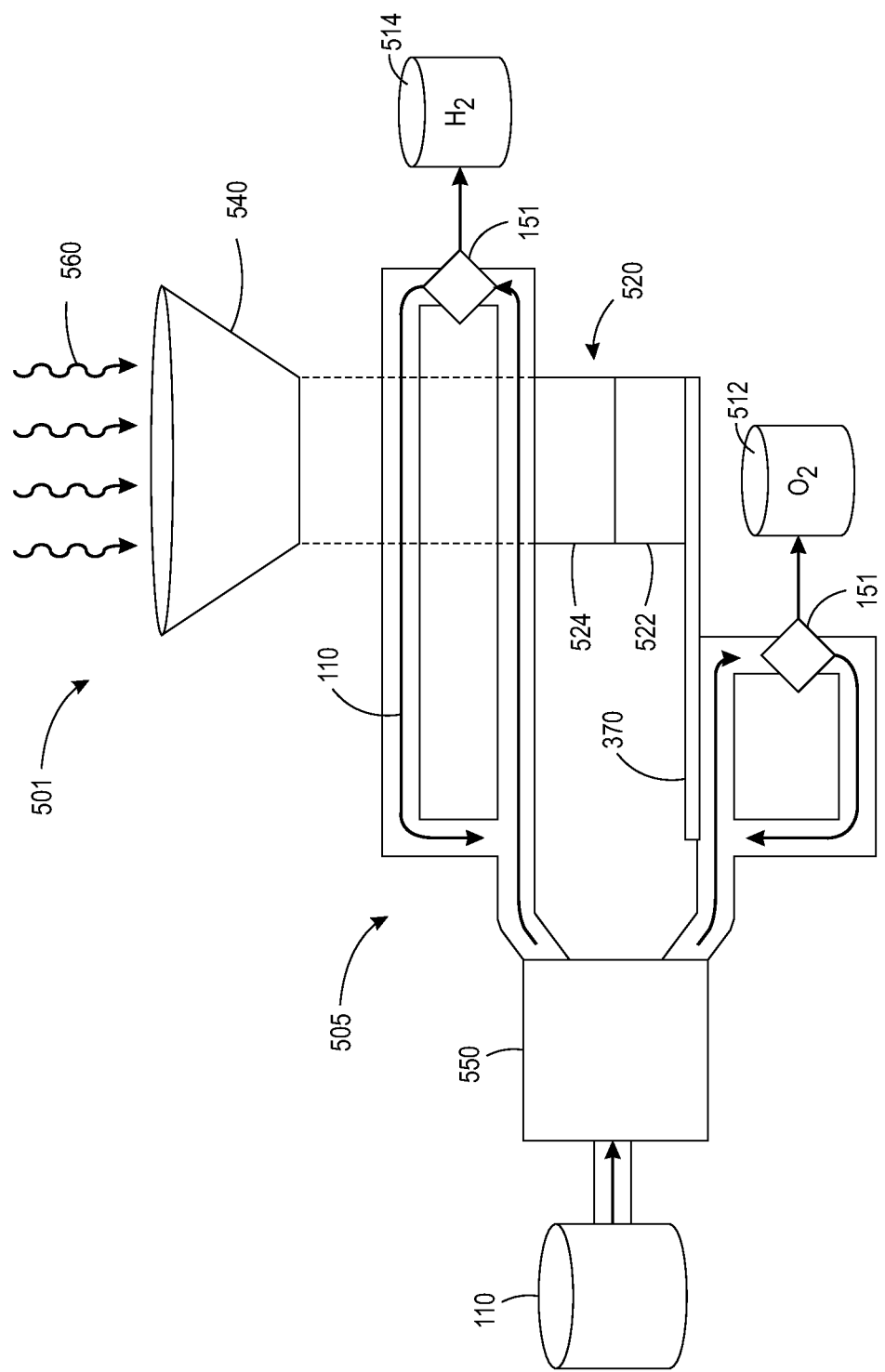

FIG. 5B shows a photoelectrolysis system 501 that is similar in many respects to photoelectrolysis system 500. In system 501, the two electrode materials 522, 524 are adjacent to one another and the conductor 570 is connected to electrode 522 and to the lower electrolyte flow loop. In systems 500 and 501, the upper and lower flow loops need not be completely separate from each other and alternatively may be adjacent to one another and separated by a membrane. It will be appreciated that the terms "lower" and "upper" are merely used to identify certain structures in the context of FIGS. 5A and 5B. These terms are not meant to imply that any particular orientation of the flow loops is required.

Multiple photochemical devices may be arranged in various ways. In some arrangements, multiple individual PEC cells can be arranged in flow units that share at least one component of the electrolyte flow mechanism, e.g., use a common electrolyte pump. In some arrangements, multiple individual PEC cells can be arranged in concentrator units that share a concentrator. In some implementations, the concentrator units can be combined in a system that shares a pump. The multiple concentrator units can share a tracking system or have separate tracking systems.

Some embodiments discussed herein involve controlling the flow rate in a photoelectrolysis system to reduce the collection of bubbles at the surface of the electrodes of the photochemical cell. In some embodiments, the collection of bubbles may be further reduced through the use of a surfactant or other chemical in the electrolyte or coated on the electrode surface.

According to various embodiments described herein, the flow rate of the electrolyte may be controlled based on one or more predetermined or expected characteristics of a photoelectrolysis system such as gas production rate, concentrator power and/or heat generation. In some embodiments, the flow rate may be adaptively controlled based on changing system or process characteristics.

Figure 6:
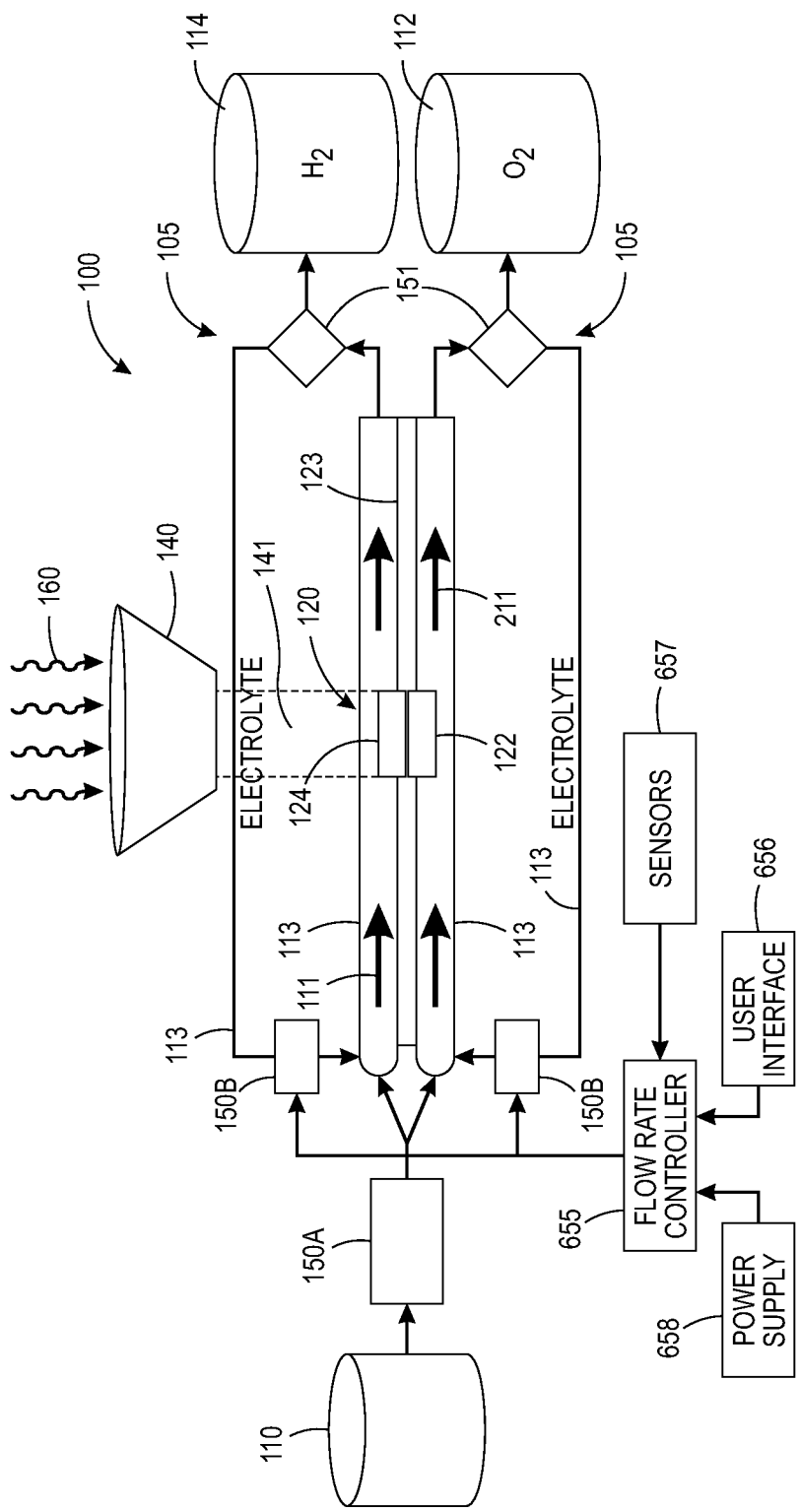
FIG. 6 shows a photoelectrolysis system that controls the flow rate of the electrolyte based on measured characteristics of the photoelectrolysis in accordance with one or more embodiments of the present disclosure.

FIG. 6 shows a photoelectrolysis system 600 that is similar in many respects to system 100 shown in FIG. 1. System 600 differs in that it includes an electrolyte flow apparatus 605 capable of adaptively controlling the electrolyte flow rate, e.g., based on measured characteristics of the photoelectrolysis process. Optionally, in some embodiments, the electrolyte flow apparatus 605 includes one or more sensors 657 configured to sense one more characteristics of the photoelectrolysis system or process. These sensed characteristics may be used by the flow rate controller 655 to control the electrolyte flow rate.

Optionally, in some embodiments, one or more components of the electrolyte flow apparatus 605 are powered by a power supply 658 that converts solar energy to electrical energy, such as a photovoltaic array. The photovoltaic array may be mounted on the same tracking mount as the photoelectrolysis system and/or the optical concentrator 640 of the photoelectrolysis system may also provide concentrated light to the photovoltaic array.

In some embodiments, the flow rate controller 655 is configured to control the flow rate of the electrolyte 110 based one or more predetermined or expected characteristics of the photoelectrolysis process or system. In some embodiments, the flow rate controller 655 may control the flow rate based on the measured characteristics of the photoelectrolysis process or system obtained from the sensors 657. Optionally, in some embodiments, the electrolyte flow apparatus 605 may include a user interface 656 communicatively coupled to the flow rate controller 655. In some implementations, the flow rate controller 655 can be accessed via a user interface 656 which allows a user to preset a desired flow rate and/or to enter other control parameters used by the controller 655. In some embodiments, the user interface 656 may be configured to allow the user to enter one or more system or process characteristics that are used by the controller to control the flow rate. For example, via a user interface, the user may specify the one or more particular characteristics used by the controller to determine the flow rate of the electrolyte; may enter threshold values used to initiate or terminate the electrolyte flow and/or to increase or decrease the electrolyte flow rate. The user interface 656 may communicate with the controller 655 through a wired or wireless connection.

In some implementations, controller 655 is configured to automatically determine what the flow rate of the electrolyte should be based on estimated or sensed system or process characteristics and to control the pump to achieve this flow rate. For example, the controller 655 may be configured to control the flow rate as a function of the estimated or sensed gas production rate. The gas production rate, e.g., the amount of hydrogen or oxygen produced per unit time, can be sensed using one or more sensors 657. A user may specify via the user interface 656 one or more of the system or process characteristics that are used to control the electrolyte flow rate and/or may also specify to what extent certain characteristics are used to control the electrolyte flow rate.

In some implementations, the flow rate can be controlled based on a sensed amount of bubbles collected at the surface of the electrodes. For example, the sensor 657 may comprise an optical sensor that measures the amount of light reflected from or near the surface of the PEC cell 120. For example, the optical reflectivity of bubbles may be different from, e.g., higher than, the optical reflectivity of the electrode surface. Thus, the sensed amount of light reflected from the electrode surface can be used as a feedback signal to control the flow rate produced by the pump 150.

In some implementations, gas production rate and/or gas concentration may be estimated based on the intensity of the solar radiation and/or concentrator power, for example. In some cases, the flow rate controller 655 may be configured to control the supply 150a and/or circulating pumps 150b to initiate or increase the electrolyte flow rate when there is a predetermined level of light intensity. When the light intensity drops below the predetermined level, the flow controller 655 may be configured to control the pump 150b to reduce or stop the flow of the electrolyte 110 past the PEC cell 120.

Figure 7:
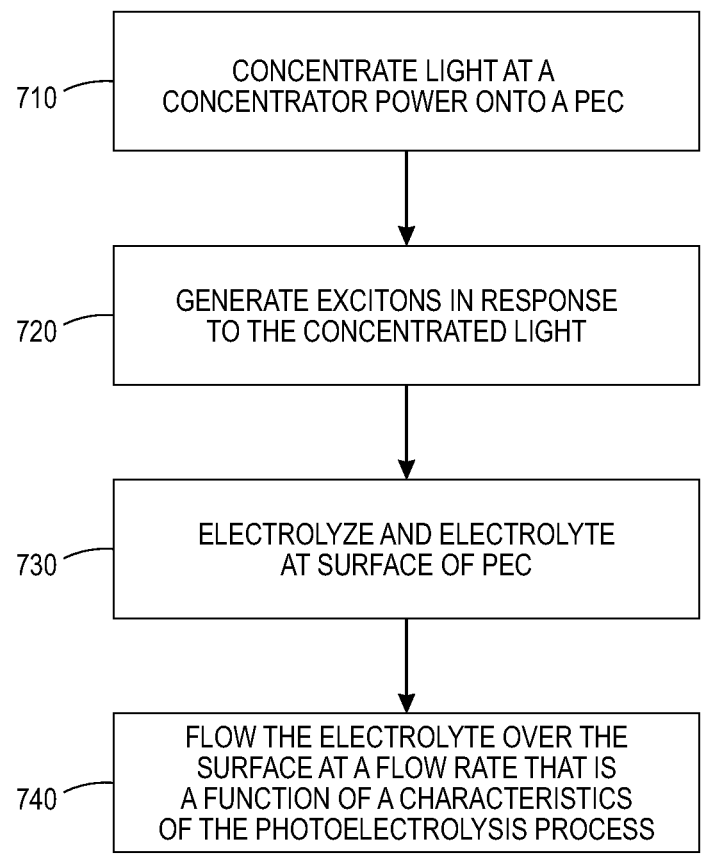
FIG. 7 is a flow diagram that illustrates photoelectrolysis processes in accordance with one or more embodiments of the present disclosure.

FIG. 7 is a flow diagram that illustrates a photoelectrolysis process according to embodiments discussed herein. Light is concentrated 710 at a concentrator power onto a surface of a PEC cell comprising a semiconductor electrode and a counter electrode. Excitons are generated 720 in the semiconductor electrode of the PEC cell response to the concentrated light. The electrolyte is electrolyzed 730 into $H_2$ and $O_2$ at a surface of one or both of the semiconductor electrode and the counter electrode by the excitons. The electrolyte is flowed 740 over the surface of one or both PEC electrodes at a flow rate that is a based on one or both predetermined and/or measured characteristics of the photoelectrolysis process or system, e.g., bubble generation, gas concentration, gas production, light intensity, heat generation, concentrator power, etc.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A system capable of photoelectrolysis comprising:
   at least one photoelectrochemical (PEC) cell the PEC cell comprising:
      a photoanode; and
      a photocathode;
   a concentrator configured to provide concentrated light to PEC cell;
   an electrolyte, the PEC cell configured to electrolyze the electrolyte into $H_2$ and $O_2$ in response to excitons generated by the concentrated light on the PEC cell; and
   an electrolyte movement apparatus configured to pressurize the electrolyte above an atmospheric pressure, the electrolyte movement apparatus including:
      a pump configured to move the electrolyte over surfaces of one or both of the photoanode and the photocathode;
      a feedback component configured to measure one or more characteristics of the photoelectrolysis and to generate a feedback signal based on the characteristics, the characteristics including at least a portion of surface area of at least one of the photoanode and the photocathode that is covered by bubbles; and
      a controller configured to control a flow rate produced by the pump based on the feedback signal.

2. The system of claim 1, wherein the electrolyte movement apparatus is configured to move the electrolyte at a predetermined flow rate that is based on expected characteristics of the photoelectrolysis.

3. The system of claim 1, wherein the one or more characteristics comprise one or more of, concentration of bubbles in a volume of the electrolyte, electrolyte pressure, heat generated by the PEC cell, light intensity, concentrator power, and gas generation rate.

4. The system of claim 1, wherein at least one of the photoanode and photocathode includes a protective coating.

5. The system of claim 1, wherein at least one of the photoanode and the photocathode includes a catalyst.

6. The device of claim 1, wherein the electrolyte comprises water.

7. The device of claim 1, wherein the electrolyte flow apparatus is further configured to pressurize the electrolyte to at least 30 atm.

8. The device of claim 1, wherein the concentrator power is greater than about 50×.

9. The device of claim 1, wherein the concentrator power is between about 50× and about 500×.

10. The device of claim 1, further comprising an optical filter or coating configured to reduce incidence of some wavelengths of the light on the PEC cell.

11. The device of claim 1, wherein the concentrated light passes through the electrolyte to reach the PEC cell.

12. The device of claim 1, further comprising a tracking apparatus configured to track a position of the sun.

13. The device of claim 1, wherein the pump is configured to move the electrolyte at a flow rate that maintains temperature of the PEC cell below about 320 degrees Kelvin.

14. The device of claim 1, wherein the at least one PEC cell comprises multiple individual PEC cells.

15. The device of claim 14, wherein the multiple individual PEC cells are connected to operate in parallel.

16. The device of claim 1, wherein the flow rate is configured to provide substantially no bubbles in an optical path between the concentrator and the PEC cell.

17. The device of claim 1, wherein the flow rate is configured to provide accessibility of a majority of a surface area of the electrode surface to the electrolyte during operation of the PEC cell.

18. The device of claim 1, further comprising a membrane that separates the photoanode from the photocathode.

19. The apparatus of claim 1, wherein the pump is configured to pressurize the electrolyte above the atmospheric pressure and to move the pressurized electrolyte over the surfaces of one or both of the photoanode and the photocathode.

20. The apparatus of claim 1, further comprising a pressurizing pump configured to pressurize the electrolyte above an atmospheric pressure, wherein the pump is a flow pump and the flow pump is configured to move the pressurized electrolyte over the surfaces of one or both of the photoanode and the photocathode.

21. The apparatus of claim 1, wherein the feedback component includes an optical sensor configured to measure an amount of light reflected from or near a surface of the PEC cell, the amount of light indicative of an amount of bubbles at the photoanode and/or photocathode, the sensor configured to generate the feedback signal based on the measured amount of light.

22. A method providing photoelectrolysis, comprising:
concentrating light onto a photoelectrochemical (PEC) cell comprising a photoanode and a photocathode;
generating excitons in the PEC cell in response to the concentrated light;
pressurizing an electrolyte to a pressure above an atmospheric pressure;
electrolyzing the electrolyte into hydrogen and oxygen at surfaces of one or both of the photoanode and photocathode using the excitons; and
flowing the electrolyte over the surfaces of one or-both of the photoanode and the photocathode at a flow rate;
measuring one or more characteristics of the photoelectrolysis, the characteristics comprising a portion of surface area of at least one of the photoanode and the photocathode that is covered by bubbles;
generating a feedback signal based on the measured characteristics; and
controlling the flow rate using the feedback signal.

23. The method of claim 22, wherein flowing the electrolyte comprises moving the electrolyte at a predetermined flow rate that is based on expected characteristics of the photoelectrolysis.

24. The method of claim 22, wherein the one or more characteristics comprise one or more of concentration of bubbles in a volume of the electrolyte, electrolyte pressure, heat generated by the PEC cell, light intensity, concentrator power, and gas generation rate.

25. The method of claim 22, wherein measuring the portion of the surface area comprises measuring an amount of light reflected from or near a surface of the PEC cell, the amount of reflected light indicative of an amount of bubbles at the photoanode and/or photocathode.

* * * * *